(12) United States Patent
Schwegler, Jr. et al.

(10) Patent No.: US 7,042,468 B2
(45) Date of Patent: May 9, 2006

(54) TEXT OVERLAY FOR MULTI-DIMENSIONAL CONSTRUCTION PROJECT MODELS

(75) Inventors: Benedict Richard Schwegler, Jr., Long Beach, CA (US); Martin Arthur Fischer, Menlo Park, CA (US); Kathleen McKinney Liston, Menlo Park, CA (US); Ragip Akbas, Palo Alto, CA (US)

(73) Assignee: Disney Enterprises, Inc., Burbank, CA (US)

( * ) Notice: Subject to any disclaimer, the term of this patent is extended or adjusted under 35 U.S.C. 154(b) by 443 days.

(21) Appl. No.: 10/138,287

(22) Filed: May 2, 2002

(65) Prior Publication Data

US 2003/0052877 A1    Mar. 20, 2003

Related U.S. Application Data

(60) Provisional application No. 60/289,020, filed on May 4, 2001.

(51) Int. Cl.
*G09G 5/00* (2006.01)
*G06F 19/00* (2006.01)

(52) U.S. Cl. ............... 345/629; 700/182; 700/118; 700/98

(58) Field of Classification Search ........ 345/947–948, 345/471, 467, 469.1, 619–689; 700/182, 700/118, 95–98
See application file for complete search history.

(56) References Cited

U.S. PATENT DOCUMENTS

| | | | |
|---|---|---|---|
| 5,689,705 A | 11/1997 | Fino et al. ................... | 395/617 |
| 5,740,341 A | 4/1998 | Oota et al. ................... | 395/120 |
| 5,761,674 A | 6/1998 | Ito ............................... | 707/104 |
| 5,918,219 A | 6/1999 | Isherwood .................... | 705/37 |
| 6,037,945 A | 3/2000 | Loveland ..................... | 345/420 |

(Continued)

OTHER PUBLICATIONS

International Search Report (PCT) dated Oct. 29, 2002.
Murray, Norman, et al., A virtual Environment for Building Construction, Sep. 2000; ISARC, pp. 1137-1142, entire doc.
Thabet, Walid, Design/Construction Integration through Virtual Construction for Improved Constructability, Virginia Tech. 1999, entire document.

(Continued)

*Primary Examiner*—Richard Hjerpe
*Assistant Examiner*—Michelle K. Lay
(74) *Attorney, Agent, or Firm*—Christopher Darrow, Esq.; Greenberg Traurig, LLP (57) ABSTRACT

The system disclosed is used to display multiple activities that act on the same component or set of components, such as walls, slabs, columns in a building etc., in a four dimensional (3D plus time) simulation Abstract of the planned or actual design, procurement and construction schedule. The user is provided with flexibility in assigning different colors and effects to different types of activities required for the design, procurement or construction of projects. These assignments provide the information necessary for 4D models to portray the design, procurement, and construction processes more accurately in a 4D simulation and display these processes in a way that is more easily understood by the viewers of 4D models. In the preferred embodiment, this is done by having the ability to overlay text in 2D or 3D on an animated 4D simulation to give the viewer of the 4D model additional information about the activities that are displayed in 4D simulation.

48 Claims, 8 Drawing Sheets

U.S. PATENT DOCUMENTS

| | | | |
|---|---|---|---|
| 6,392,651 B1 * | 5/2002 | Stradley | 345/473 |
| 6,480,194 B1 * | 11/2002 | Sang'udi et al. | 345/440 |
| 6,718,218 B1 * | 4/2004 | Matheson | 700/95 |
| 6,721,769 B1 * | 4/2004 | Rappaport et al. | 707/205 |
| 2002/0035408 A1 * | 3/2002 | Smith | 700/97 |
| 2003/0050871 A1 * | 3/2003 | Broughton | 705/28 |

OTHER PUBLICATIONS

Staub, Design-Cost-Schedule Integration for the Sequus Pharmaceuticals' Pilot Plat, 1999, entire document.

Taub-French, Feature-based Construction Cost Estimating; AACE 2000, entire document.

\* cited by examiner

*FIG. 1*

| ● Rebr Int Wall NW | 07/28/99 | 08/16/99 | REBAR |
| ● Rebr Int Footing SW | 08/13/99 | 08/16/99 | REBAR |
| ● Rebr Int Footing SE | 08/25/99 | 08/26/99 | REBAR |
| ● Rebr Int Wall SW | 08/23/99 | 08/24/99 | REBAR |
| ● Rebr Int Wall SE | 09/02/99 | 09/03/99 | REBAR |
| ◎ Form RW Footing NE1 | 06/14/99 | 06/15/99 | FORM |
| ● F/D Concrete | 05/24/99 | 06/04/99 | CONSTRUCT |
| ◎ Form RW Footing NE2 | 06/14/99 | 06/15/99 | FORM |
| ◎ Form RW Footing NW1 | 05/17/99 | 05/18/99 | FORM |
| ● Pour RW Footing NE1 | 06/18/99 | 06/18/99 | POUR |

- ● MILESTONE
- ● CONSTRUCT
- ○ TEMPORARY
- ○ WORKING
- ● TEST & ADJUST
- ● INTERIOR
- ○ MISC
- ○ LAYDOWN
- ● EXTERIOR
- ● GRAPHICS
- ● POUR
- ● REBAR
- ◎ FORM
- ○ DESTRUCT

TEXT OVERLAY FOR MULTI-DIMENSIONAL CONSTRUCTION PROJECT MODELS

CROSS-REFERENCE TO RELATED APPLICATIONS

This application claims the benefit of U.S. Provisional Application No. 60/289,020, entitled "Text Overlay for Multi-Dimensional construction Project Models" filed on May 4, 2001.

FIELD OF THE INVENTION

The invention relates generally to a system for managing a construction activity and more particularly to methods and apparatus for storing and displaying multi-dimension images of a project under construction with overlays containing specifics of scheduling details.

BACKGROUND OF THE INVENTION

A process which involves multiple entities can be difficult to manage and coordinate, especially if there are multiple documents that are to be passed between parties during the course of the process. This is the case with the construction and building industry. The planning which is required prior and during the construction of a modem building is very labor intensive where segments of which may be repeated several times during the process.

In the past, it was common in development projects to identify a list of development tasks to be performed for the entire development project and to determine the number of days each task requires for completion and the order of execution of each task. These construction tasks, including overall areas of land designs, plans, permits, etc. can be performed by a contractor, a development company's employees, sub-contractors which have sub-contracted for a specific task such as is required for rough plumbing or rough electrical work, or obtaining inspector's approval for tasks to be performed such as pouring a building slab, etc. The ordering of trusses might be done at an early stage of the construction job with the delivery of the trusses and lumber package scheduled for a day and time to start the framing of a building. Currently, in many instances, charts are made which use various types of bar charts where some bars which may indicate the number of days required to perform each task. The bars on the charts sometimes overlap and give an indication of the total number of days required for completion of the development project. These charts have limitations in that a new chart is required every time there are delays in any one of the selected tasks to be performed as a result of weather or having the subcontractors available at the proper time for the contract.

Today, almost all information about projects is generated with software tools. However, most of the commonly used tools work only in a particular domain or discipline and function only at one level of detail. Furthermore, the two-dimensional representation of three-dimensional design information and the one-dimensional representation of bar charts of four dimensional (3D plus time) schedule information make it impossible to communicate the scope and timeline of a project at all levels of detail to all affected persons in a clear manner. In addition, today's single user tools do not support the quick generation of design alternatives in group settings. It is often difficult for Architecture, Engineering and Construction professionals to easily access project data stored in discipline specific tools because there are no industry wide standards for most types of project data.

In recent years, several electronic visualization tools have become available such as 3D CAD, 4D CAD, and virtual reality. These tools communicate a project design and schedule more effectively than 2D drawings and bar chart schedules, but most of these tools are purely visualization tools. In other words, a project team can view the information from various vantage points and even fly or walk through it, but the team cannot interact with the 3D and 4D visualizations to collaboratively explore design alternatives and resolve design issues rapidly.

What is currently needed are tools that work at several levels of detail, that support interaction with visual models in a group setting, and that give users and other software tools easy access to project data in a commonly understood format for the fast paced work on design and construction projects.

SUMMARY OF THE INVENTION

The system disclosed is used to display multiple activities that act on the same component or set of components, such as walls, slabs, columns in a building etc., in a four dimensional (3D plus time) simulation of the planned or actual design, procurement and construction schedule. The user is provided with flexibility in assigning different colors and effects to different types of activities required for the design, procurement or construction of projects. These assignments provide the information necessary for 4D models to portray the design, procurement, and construction processes more accurately in a 4D simulation and display these processes in a way that is more easily understood by the viewers of 4D models. In the preferred embodiment, this is done by having the ability to overlay text in 2D or 3D on an animated 4D simulation to give the viewer of the 4D model additional information about the activities that are displayed in 4D simulation.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other systems and functions of the system for carrying out the same purposes of the present invention and that such other modifications do not depart from the spirit and scope of the invention in its broadest form.

BRIEF DESCRIPTION OF THE DRAWINGS

Other aspects, features, and advantage of the present invention will become more fully apparent from the following detailed description, the appended claim, and the accompanying drawings in which:

DETAILED DESCRIPTION

This invention relates to a system for overlaying text in 2D or 3D on an animated 4D (3D plus time) simulation to simultaneously illustrate to a viewer of the 4D model additional information about the activities that are displayed in the 4D simulation.

Because several types of activities act on a particular 3D component and many types of activities can occur simultaneously on a construction site, it is difficult for viewers to follow the specific sequence of work on a given component. It is also difficult to identify which activities are occurring simultaneously throughout the site. 4D models bring together a wide range of data about the physical aspects of a construction project in the form of 3D models.

A 4D model of the evolution of a building through design or construction as a visual, time based simulation appearing on the screen of a computer is capable of displaying a very large amount of project data. As the simulation steps through time, the 4D model graphically shows the activities in their scheduled sequence by highlighting the building components that are being worked on by the activities. The major challenge of providing this additional information about the activities is that the information must change frequently because the activities that are displayed change. The resultant information should enhance the interpretability and use of the 4D model, rather than distract the viewer with tiny type, visual clutter and irrelevant information such as open window, file names, etc. The 3D overlay should allow the user to place the text at a specific point in the model space where the most critical information needs to be communicated.

By way of example, for the completion of a capital facility project, the specific problem the invention addresses is the need to convey information to a user for each of the following items at a specific moment in time:

The name of the schedule item (e.g., "Pour Concrete Floors).

The general type of classification of that schedule item (e.g., "Construct").

The schedule item start and conclude date or time (e.g., "4/3/2002–10/3/2002"),

This information changes rapidly as the simulated discreet moment within the construction project advances during use of the simulation application. The object is to convey this information in the model view the user is monitoring, rather than distract the user from the 4D model by displaying the information on external windows, lists, or tables.

The inventive system functions within the context of a 4D construction project model. Following, by way of example, is a description of a 4D construction project model and a simulation application that provides a context in which the invention can be used.

Figure 1:
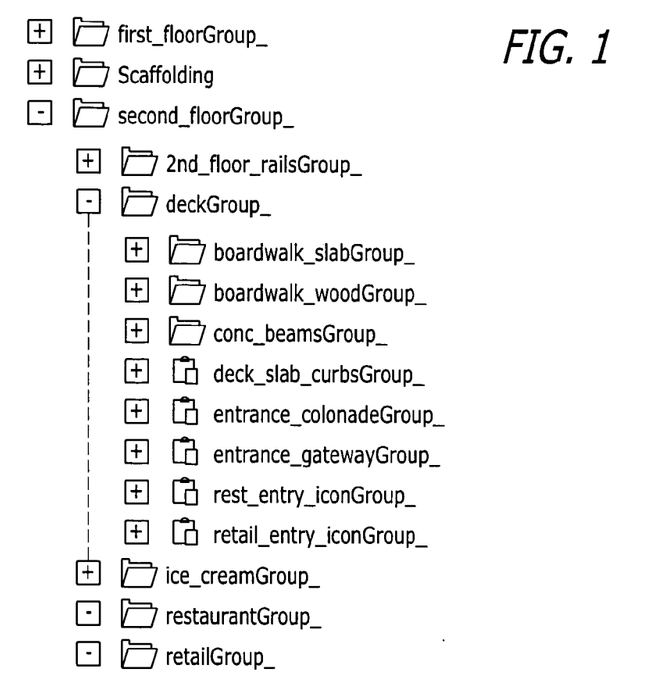
FIG. 1 illustrates examples of components that can be associated with construction activities that occur at a certain discreet date.
Figure 2:
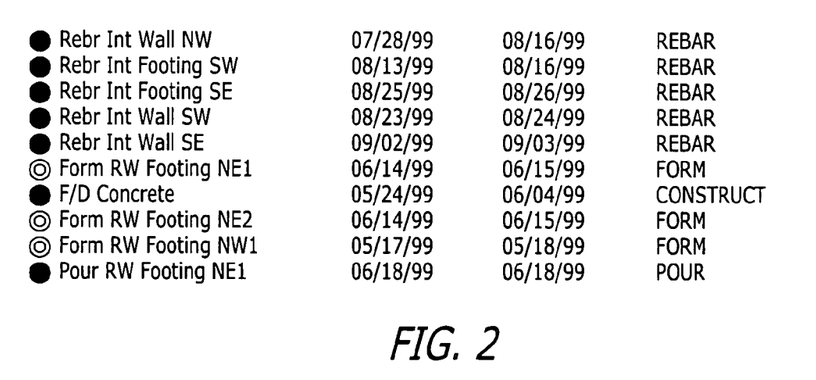
FIG. 2 illustrates a list of planned construction project schedule items that can be a part of the 4D model.
Figure 3:
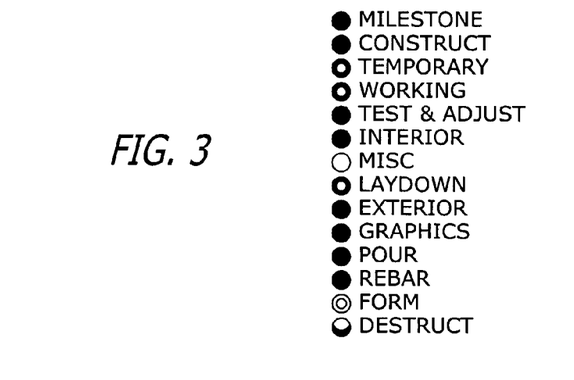
FIG. 3 illustrates the classification of schedule items to define predefined activities.
Figure 4:
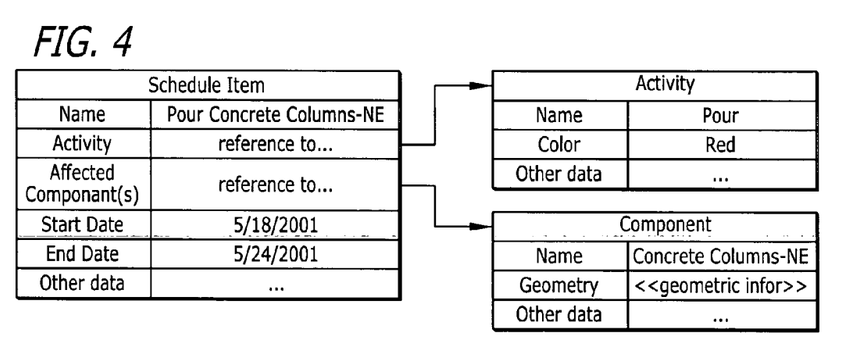
FIG. 4 illustrates the linkage between schedule item component and activity.

The 4D construction project model described below includes a three dimensional geometric model of a capital facility (building) project to be built. In such a 4D model, the three dimensional model is segmented into components, see FIG. 1, that can be associated with construction activities that occur at a certain discreet date, or occur over a discreet interval of time. A list of planned construction project schedule items, see FIG. 2, is also a part of the 4D model. Each schedule item is classified as one of several predefined activities, see FIG. 3. To support simulation of the construction project over time, linkages are created between schedule items and the 3D components that those schedule items affect, see FIG. 4.

The simulation application provides an environment for simulating the progress of the construction project relative to time. A 3D graphical display window shows the components of the 3D model that are constructed, modified, and completed as of a discreet moment in time, usually a specific calendar date. The 3D component appears in the display window in a particular color that is associated with the type of construction schedule item to enable the user to visually differentiate between a component that is being constructed on a given day (which is displayed in one distinct color), and a component that has been completed and which is displayed in another distinct color. Therefore, as the displayed date is incremented, either manually by the user or automatically by the simulation application, to simulate the progress of the construction project over time, each display frame consists of 3D components that appear in various colors intended to convey the relationship between construction schedule item and 3D component.

Figure 5:
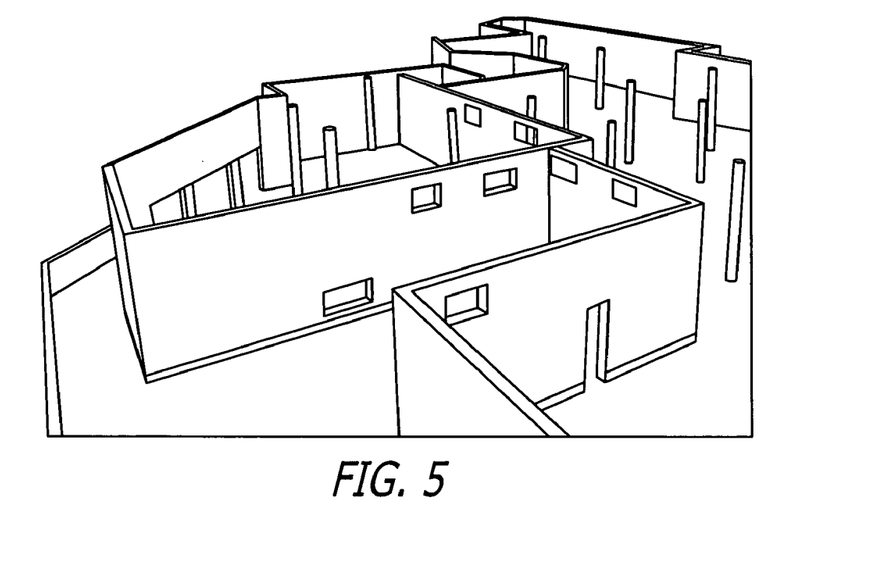
FIG. 5 illustrates an example of a building model before the 2$^{nd}$ story concrete floor section pour.
Figure 6:
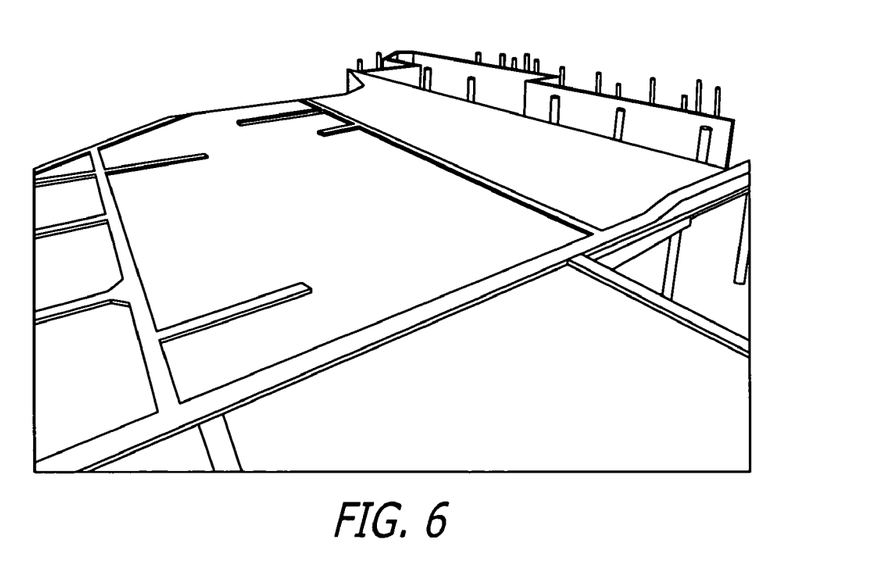
FIG. 6 illustrates the building model of FIG. 5 after the 2$^{nd}$ story concrete floor section pour.

Referring to FIG. 5, there is illustrated a model of a building model prior to the pour (the activity) for the second story concrete floor (the component). Finure 6, however, illustrates the building model after the second story concrete floor section is poured. A visual Project Manager by Genisys Infonnation Systems displays the full activity schedule in bar chart format in a window next to the window showing the evolution of the 3D model over time. The disadvantages of this prior art approach is that the text describing activities is often too smaTh the viewer needs to go back and forth between the 3D/4D window and the schedule windows; and the 3D/4D window must be smaller because the schedule window takes up significant screen real estate. Furthermore, schedules are not color coded to match the color in the 4D model, which makes it difficult to match specific activities in the schedule window to activities that are displayed in the 4D window.

The inventive system here disclosed enhances the interpretability of 4D models by overlaying color coded activity descriptions such as activity name, duration, start/end dates, CSI codes, etc. which helps the viewer of the 4D models to quickly identify the types of activities and the specific activity displayed during the 4D simulation by matching colors. Because these overlays are placed close to the 4D model simulation, it is possible for the viewers to quickly and easily keep track of the activities and their sequence. In the 3D overlay, the text can be placed anywhere within the 3D space where it is needed, which further reduces visual clutter and highlights only the most relevant information.

Additionally, the system disclosed displays a textual description of the activities occurring at the currently displayed moment in time and includes the start and end dates of those activities. The invention displays this information in the same window that the 3D model is displayed, which eliminates the need for the user to consult separate tables, windows, or lists to obtain this information.

Figure 7A:
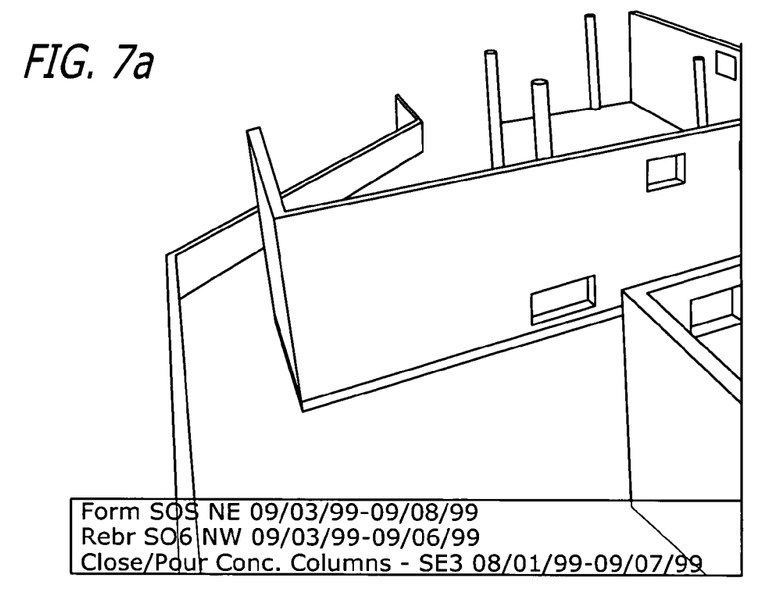
FIG. 7a illustrates a 2D text overlay.
Figure 7B:
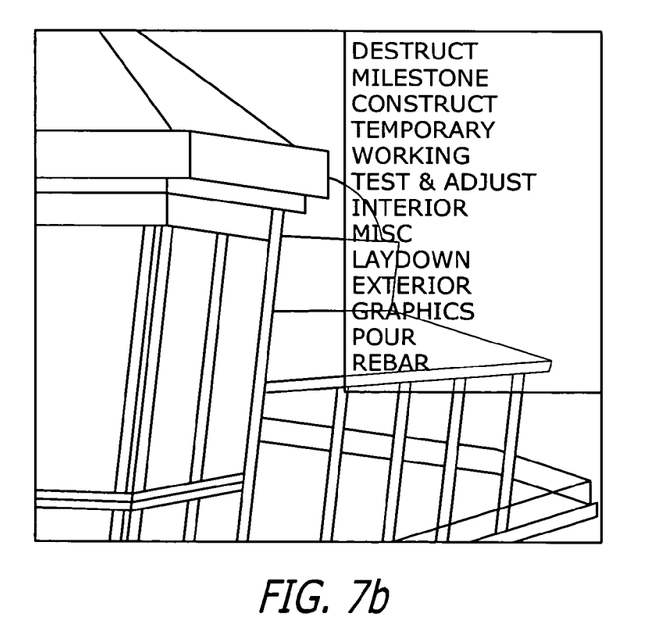
FIG. 7b illustrates activity type legend.
Figure 8:
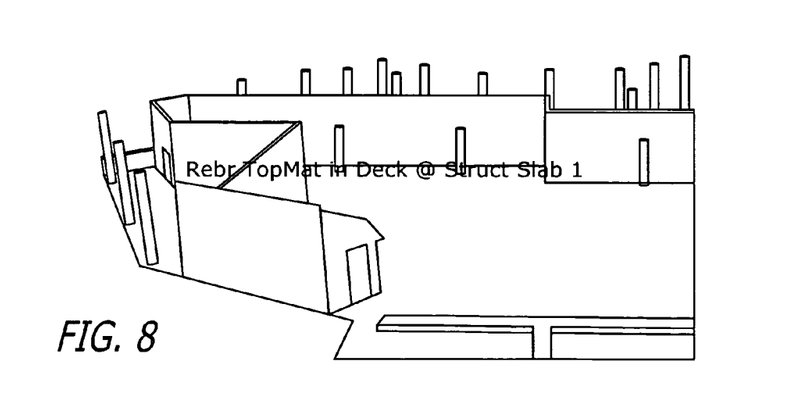
FIG. 8 is a 3D text over lay of text describing rebar activity placed on a cooperating 3D component.

The system can display this information in two ways: the first way being as 2D text, a list of color coded text items displayed in the lower left area of the model display window, see FIG. 7a, and a color coded activity legend in the upper right, see FIG. 7b; and the second way being as 3D text wherein text items are shown located in proximity with the component being affected by the schedule item, see FIG. 8.

Figure 9:
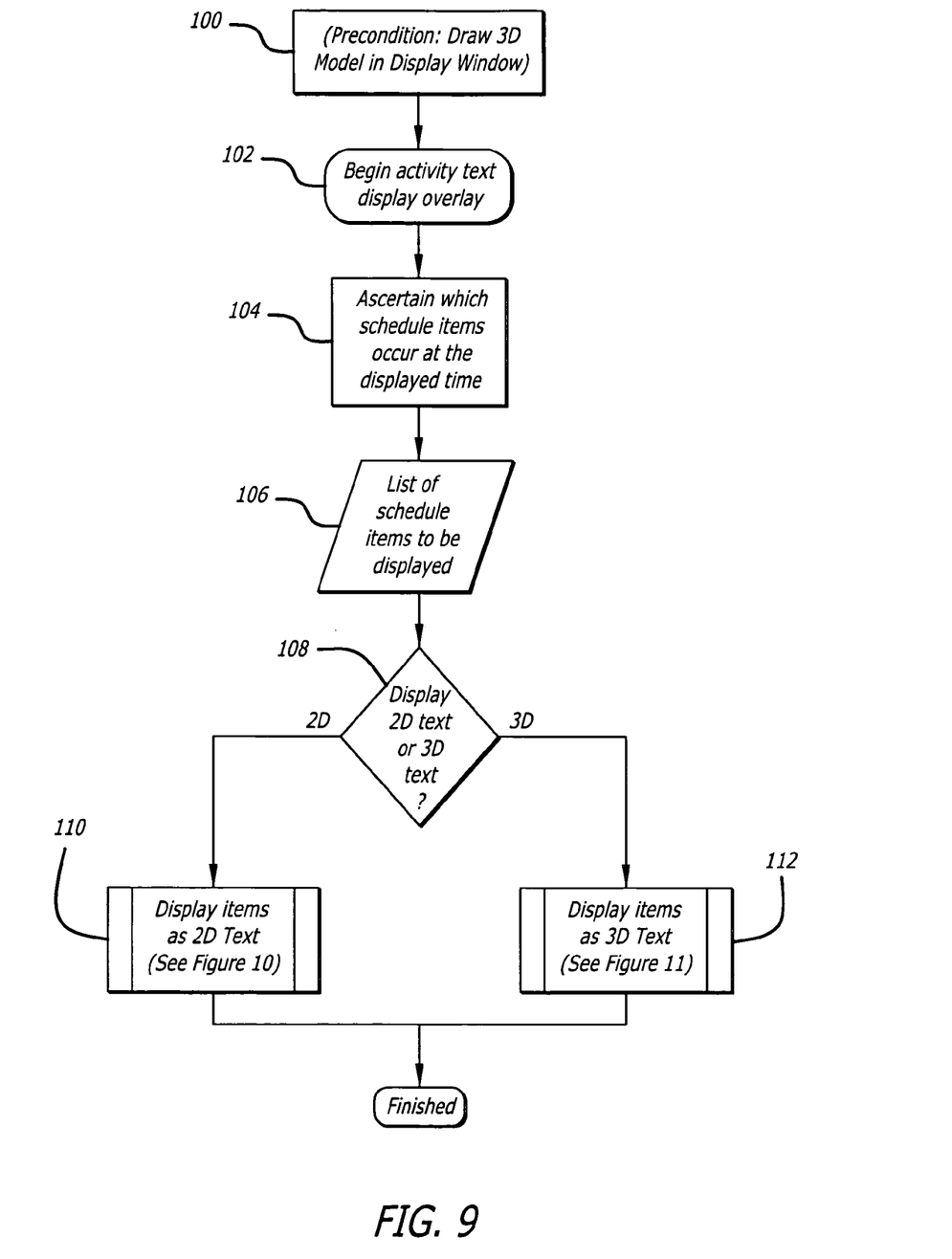
FIG. 9 is a block diagram showing a procedure for implementing the inventive concept.

FIG. 9 is a block flow diagram of the various steps for implementing the invention. As shown in FIG. 9, as a precondition, a 3D model is drawn in the display window, step 100. At step 102 the activity test is started by displaying the overlay, for step 104, where it is determined which schedule items occur at the displayed time. Thereafter, at step 106, the list of schedule items that are to be displayed are inserted. The information is then processed, step 108, to be in 2D text or 3D text. The information that is to be displayed as 2D text is further processed, step 110, as will be further described with reference to FIG. 10. The information that is to be displayed as 3D text is further processed, step 112, as will be further described with reference to FIG. 11.

Figure 10:
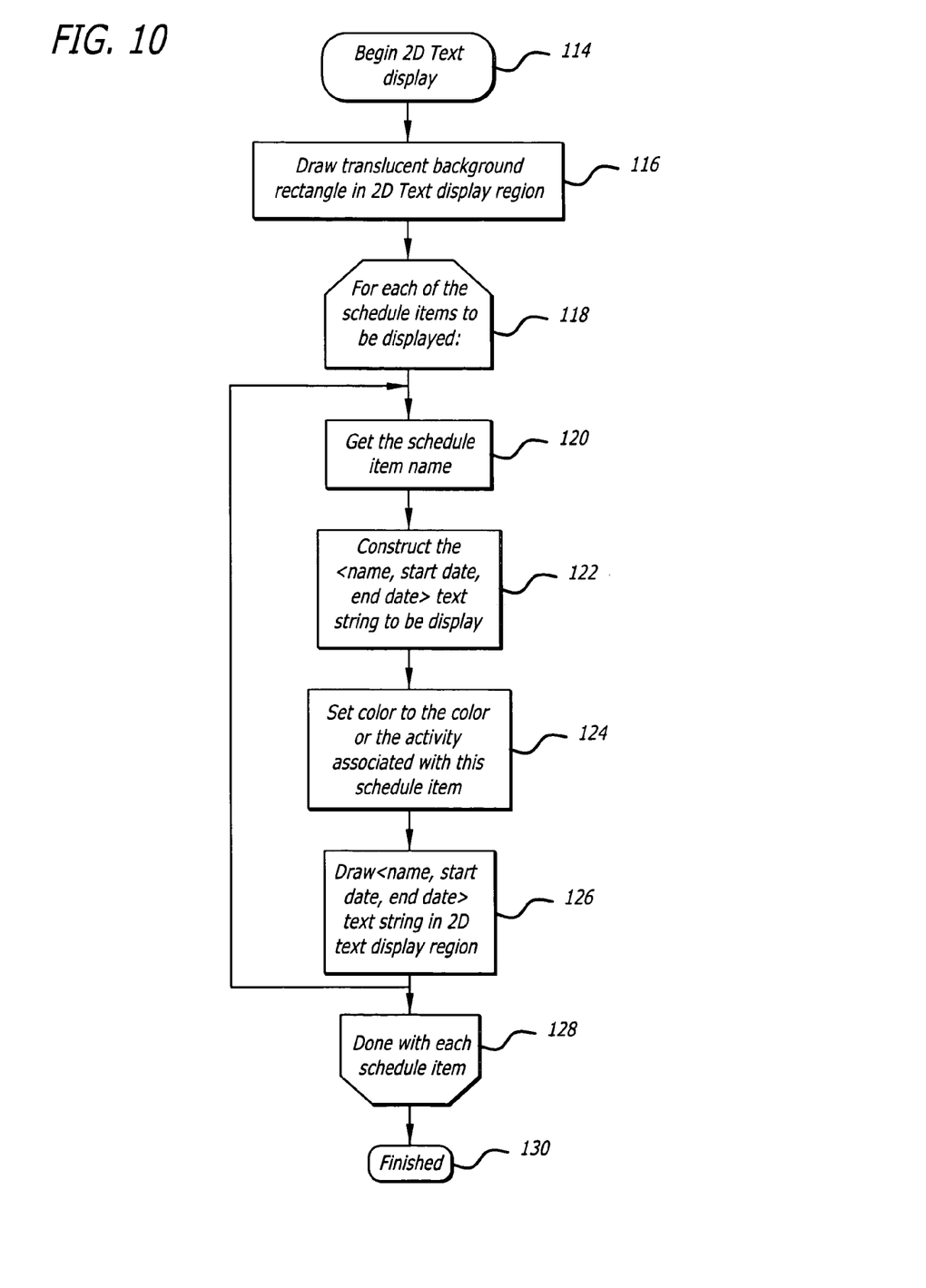
FIG. 10 is a block diagram showing a procedure used to display the overlay text as 2D text.

Referring to FIG. 10, there is shown a block diagram of the steps performed to provide the 2D test overlay which starts at step 114. At step 116, a translucent background rectangle in 2D text in the display region is drawn, and is repeated, step 118, for each schedule item. Next, step 120, the schedule item name is obtained for each item name and, at step 122, the "name, start date and end date" text string that is to be displayed is generated. Thereafter, step 124, the color is determined for the activity associated with the schedule item. The "name, start data, end date" text string in 2D text is again displayed, step 126. Steps 120 through 126 are repeated for each schedule item, step 128, after which, at step 130, the process for 2D overlay is completed.

Figure 11:
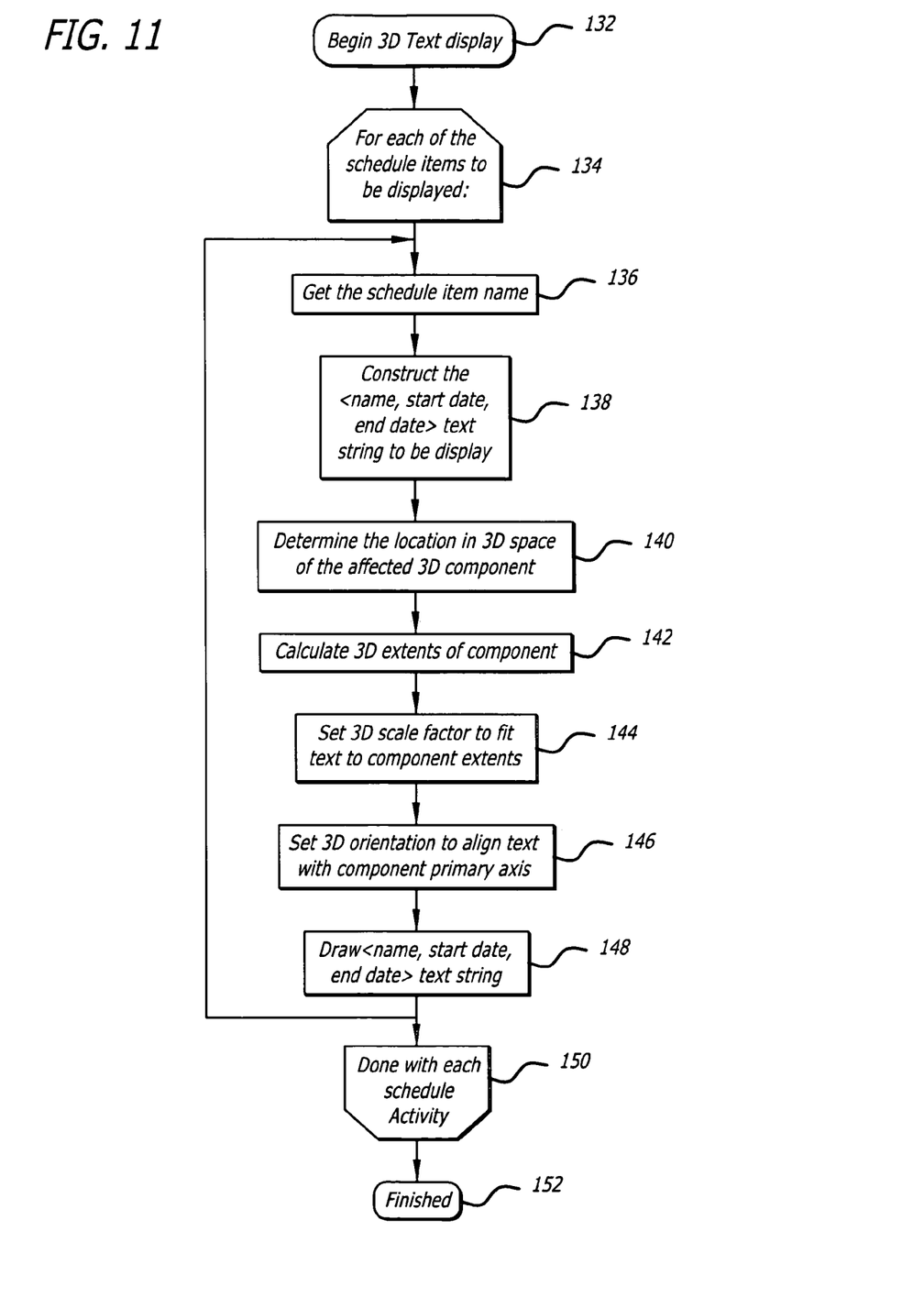
FIG. 11 is a block diagram showing a procedure for displaying the overlay text as 3D text; and, FIG. 12 is a block diagram of user program functions for implementing the inventive system.

Referring to FIG. 11, there is illustrated a block diagram of the steps for displaying the overlay text as 3D text which begins at step 132. For each of the schedule items that is to be displayed, steps 134 and 136, the schedule item name is obtained. At step 138, the "name, start date, end date" text string that is to be displayed is constructed. A determination is now made of the location in 3D space of the affected 3D component, step 140; and the 3D extents of the component are then calculated, step 142. At this time the 3D scale factor required to fit the text to the component extents are set, step 144; and, at step 146, the 3D orientation to align the text with the component primary axis is set. Then, step 148, the "name, start date and end date" text string is drawn. Steps 136 through 148 are repeated for each schedule activity, step 150, until the last test string is completed at which time the process is then finished, step 152.

Figure 12:
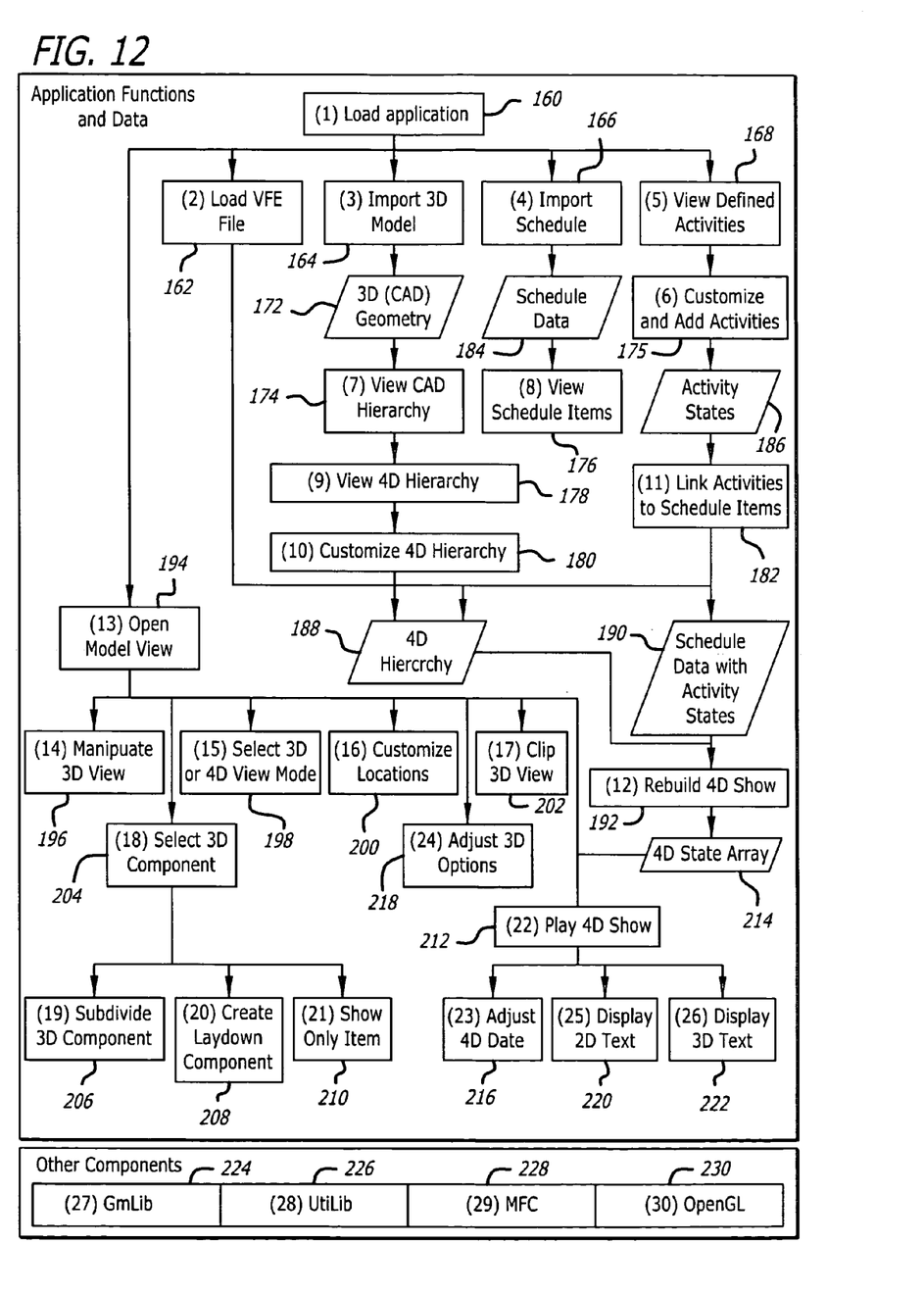

FIG. 12 illustrates a block diagram of application functions that the user may initiate while using the system disclosed.

Load application (160). This is the function of starting the 4D Viz software application. This software runs as an executable file the common format for software applications on the Windows platform.

Load VFE File (162). This file provides the ability to load an input file consisting of schedule items, activities, 4D component hierarchy, camera locations, and relationships between schedule items and 4D components. It also de-references a link to an external 3D geometry file and loads the 3D geometry.

Load the 3D Model (164). This function is the ability to load 3D geometry from a VRML format file.

Import schedule (166). Provides the ability to load schedule data from Primavera.

View defined activities (168). This function provides a user interface for reviewing the currently defined activities.

Customize and add activities (170). Provides the user with the ability to create and modify the various activity states.

View CAD Hierarchy (174). This is a mechanism for viewing the 3D scene graph (a public domain concept) imported into the model using 3D (CAD) geometry (172). It is a hierarchical or "tree" view similar in style to common tree views like the Microsoft Windows Explorer file manager.

View schedule items (176). This function provides the user wit a mechanism to view the list of schedule items imported into the model using the schedule data step (184). The list includes schedule items that are associated or potentially associated with 4D components. Relevant data associated with each schedule item is displayed in columns in the view.

View and customize 4D Hierarchy (178, 180). This function provides the user with an interface with which to organize a hierarchy of components. Drag and drop supports linkage to CAD Components.

Link activities to schedule items (182). This function provides the user with the ability to use drag and drop to create links between schedule items and activities and receives input from activity states (186).

Rebuild 4D show (192). This function computes the object states for all components based on the most recent schedule data and links between schedule items and components and receives information from 4D Hierarchy (188) and schedule data with activity states (190).

Open model view (194). Displays the 3D model and 4D model which, when viewed, is a snapshot of the 4D model at a certain date.

Manipulate 3D viewing location and orientation (196). This function enables the user to change the viewpoint, or perspective, of the model view. These functions include: Go (move the camera forward/back and up/down based on movement of the mouse); Tilt (change viewing direction based on movement of the mouse); Slide (move the camera laterally based on the movement of the mouse); Rotate (move the camera around the model on a sphere); and, Straighten (align the camera's up direction with the vertical).

Select 3D or 4D view mode (198). This function allows the user the option of viewing 3D (all 3D geometry) or 4D (a snapshot of the 4D model at a discreet time).

Customize user defined viewing locations/orientations (200). This function provides the user with the ability to save and return to specific viewpoints or "locations" in the model view.

Clip 3D view (202). This function allows the user to divide the model, for viewing purposes only by placing "clipping planes" which render the geometry on one side of each plane invisible.

Select 3D component (204). This function enables the user to select a 3D component, either in the model view or the CAD components view.

Subdivide 3D component (206). This function allows the user to break components into smaller pieces to provide the granularity necessary to schedule the activities associated with those smaller pieces.

Create lay down component (208). This function allows the user to create temporary "lay down areas" in the 4D model.

Display specified item only (210). This allows the user to view only a specific component in the model view. It is accomplished by setting the root of the scene graph to be the branch containing the specified component.

Play 4D show (212). This function, which receives information from 4D state array (214) and the open model view function (194) increments the date (in user definable increments) and updates the 4D model view to show components and activities that are active at the current date.

Adjust 4D date (216). This allows the user to specify a specific date to show in the model view by choosing from a calendar style user interface element.

Adjust 3D option (218). This function provides the user with an interface to customize the location of the camera (viewpoint), change the background color, and specify clipping planes.

Display 2D text (220). This function provides a textual description of the activities occurring at the currently displayed moment in time, and the start and end dates of those activities. It provides a list of color coded text items displayed in the lower left area of the model view window and a color coded activity legend in the upper right of the model view window.

Display 3D text (222). This function that provides a textual description of the activities occurring at the currently displayed moment in time, and the start and end dates of those activities. Text items are shown proximally located with the component being affected by the schedule item.

Other functions present are GmLib (224); UtilLib (226); MFC (228); and, Open GL (230). GmLib is a mesh based library for rendering, storage, and serialization of geometry. UtilLib is a small collection of extensions to MFC user interface elements. MFC (Microsoft Foundation Classes) is included with the Microsoft visual C++ development environment. OpenGL is the graphics library originally developed by SGI and now available in several different implementations. In the system here disclosed, the library implementation that comes bundled with Microsoft Windows based operating system can be used.

While there has been described herein the principles of the invention it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. A computer-implemented automated building design and modeling system, comprising:

a first storage means for storing raw image data corresponding to a plurality of objects representing three dimensional (3D) construction components of a building being modeled such that each object describes information sufficient for assembly of a complete building to be displayed;

a second storage means for storing activity data corresponding to a plurality of activities to be displayed;

a third storage means for storing schedule data of a schedule item related to the plurality of activities to be displayed;

an image processing means coupled to the first storage means for performing predetermined processing operations on the raw image data and for providing corresponding display data;

a fourth storage means coupled to the image processing means for storing the display data processed by the image Processing means;

a data retrieval means coupled to retrieve the activity data, the schedule data, the display data, a previous four-dimensional (4D) hierarchy, and relationships between the schedule data and the previous four-dimensional (4D) hierarchy to be displayed, wherein the previous four-dimensional hierarchy represents an animated sequencing of a virtual construction of the complete building according to a user design and the schedule data;

a user interface for generating input signals indicative of selected images and image formats to be viewed such that the construction of the building is constrained by the input of selected client requirements that specify a configuration of the building model, the user interface enabled to receive the following inputs:

a list of activities for construction of the complete building to be stored in the second storage means, a list of interdependencies of the time sequence of the activities to be stored in the third storage means as schedule data, a list of the time duration estimates of each of the activities to be stored in the third storage means as schedule data, and a desired completion date of the construction of the complete building wherein the schedule data is linked with the activity data;

a schedule processing means coupled to the user interface, the second storage means, and the third storage means for calculating a baseline schedule date for the start of each activity, the baseline schedule date for the start of each activity being calculated by subtracting the duration of the activity from the baseline schedule date for the start of the following activity, the desired completion date being the last baseline schedule date, wherein the third storage means coupled to store the baseline schedule dates including the plurality of start dates and the plurality of completion dates;

a fifth storage means for storing the plurality of user-defined building models customized based upon the client requirements entered using the user interface;

a display means coupled to the data retrieval means and the fifth storage means for displaying the activity data, the schedule data, the display data, the previous four-dimensional (4D) hierarchy, the user-defined building models, and the plurality of relationships between the schedule data and the previous four-dimensional (4D) hierarchy; and a means for initiating automatic simulated assembly of the plurality of user-defined building models to generate a graphical representation of a floor plan of the complete building, wherein the plurality of user-defined building models are assembled into the complete building according to a sequential assembly hierarchy, wherein the schedule data and activity data of the corresponding model is linked to each floor plan to generate a present four-dimensional (4D) hierarchy, wherein the present four-dimensional hierarchy represents an animated sequencing of the virtual construction of the complete building according to the user-defined building models and the schedule data;

wherein the display means displays the present four-dimensional (4D) hierarchy and the display means is enabled to update the display of the floor plan to display the schedule data and the activity data associated with each user-defined building model that are active as of a current date, and wherein the display means displays a textual overlay that includes a color-coded list of items positioned in a lower area of the display means and a color-coded activity legend positioned in an upper area of the display means.

2. The system of claim 1, wherein the graphical representation is selected from a group consisting of design development drawings, specifications, construction drawings, shop drawings, and design details.

3. The system of claim 1, wherein the user interface is enabled to receive the user input to change a perspective of the graphical representation by moving the perspective forward, moving the perspective backward, moving the perspective vertically upward, moving the perspective vertically downward, tilting the graphical representation, sliding the perspective, rotating the perspective around the graphical representation, and aligning the perspective with a vertical plane.

4. The system of claim 1, wherein the user interface is enabled to receive the user input to choose three dimensional (3D) graphical representation and four dimensional (4D) graphical representation.

5. The system of claim 1 wherein the user interface is enabled to receive the user input to save a perspective.

6. The system of claim 1, wherein the user interface is enabled to receive the user input to identify a clipping plane which renders the graphical representation on a first side of the clipping plane invisible while the second side of the clipping plane is visible.

7. The system of claim 1, wherein the user interface is enabled to receive the user input to segment the construction components into a plurality of smaller segments to provide the granularity necessary to schedule the activities associated with the plurality of smaller segments.

8. The system of claim 1, wherein the user interface is enabled to receive the user input to generate temporary lay down areas in a graphical representation that is four dimensional.

9. The system of claim 1, wherein the user interface is enabled to receive the user input to view one construction component of the graphical representation.

10. The system of claim 1, further comprising a four dimensional state array coupled to the display means wherein the display means increments the date and updates the graphical representation using the four dimensional state array to display construction components and associated activity data that are active at the current date.

11. The system of claim 10, wherein the user interface is enabled to receive the user input to view a specific date.

12. The system of claim 1, wherein the activity data displayed includes a start date and an end date.

13. The system of claim 1, wherein the display means displays a two dimensional textual overlay that includes a color-coded list of items positioned in a first user-defined position of the display means and a color-coded activity legend positioned in a second user-defined position of the display means, wherein the user interface is enabled to receive a first user-defined position and a second user-defined position.

14. The system of claim 1, wherein a color is associated with the graphical representation of the construction component and the same color is associated with a respective schedule item such that the user is enabled to visually differentiate between a component that is being constructed on a given date and a component that has been completed on a prior date.

15. The system of claim 1, wherein the display means displays a three dimensional textual overlay whereby schedule items are shown proximally located near the associated construction component.

16. A computer-implemented automated building design and modeling system, comprising:

a first storage means for storing raw image data corresponding to a plurality of objects representing three dimensional (3D) construction components of a building being modeled such that each object describes information sufficient for assembly of a complete building to be displayed;

a second storage means for storing activity data corresponding to a plurality of activities to be displayed;

a third storage means for storing schedule data of a schedule item related to the plurality of activities to be displayed;

an image processing means coupled to the first storage means for performing predetermined processing operations on the raw image data and for providing corresponding display data;

a fourth storage means coupled to the image processing means for storing the display data processed by the image processing means;

a data retrieval means coupled to retrieve the activity data, the schedule data, the display data, a previous four-dimensional (4D) hierarchy, and relationships between the schedule data and the previous four-dimensional (4D) hierarchy to be displayed, wherein the previous four-dimensional hierarchy represents an animated sequencing of a virtual construction of the complete building according to a user design and the schedule data;

a user interface for generating input signals indicative of selected images and image formats to be viewed such that the construction of the building is constrained by the input of selected client requirements that specify a configuration of the building model, the user interface enabled to receive the following inputs:

a list of activities for construction of the complete building to be stored in the second storage means, a list of interdependencies of the time sequence of the activities to be stored in the third storage means as schedule data, a list of the time duration estimates of each of the activities to be stored in the third storage means as schedule data, and a desired completion date of the construction of the complete building wherein the schedule data is linked with the activity data;

a schedule processing means coupled to the user interface, the second storage means, and the third storage means for calculating a baseline schedule date for the start of each activity, the baseline schedule date for the start of each activity being calculated by subtracting the duration of the activity from the baseline schedule date for the start of the following activity, the desired completion date being the last baseline schedule date, wherein the third storage means coupled to store the baseline schedule dates including the plurality of start dates and the plurality of completion dates;

a fifth storage means for storing the plurality of user-defined building models customized based upon the client requirements entered using the user interface;

a display means coupled to the data retrieval means and the fifth storage means for displaying the activity data, the schedule data, the display data, the previous four-dimensional (4D) hierarchy, the user-defined building models, and the plurality of relationships between the schedule data and the previous four-dimensional (4D) hierarchy; and a means for initiating automatic simulated assembly of the plurality of user-defined building models to generate a graphical representation of a floor plan of the complete building, wherein the plurality of user-defined building models are assembled into the complete building according to a sequential assembly hierarchy, wherein the schedule data and activity data of the corresponding model is linked to each floor plan to generate a present four-dimensional (4D) hierarchy, wherein the present four-dimensional hierarchy represents an animated sequencing of the virtual construction of the complete building according to the user-defined building models and the schedule data;

wherein the display means displays the present four-dimensional (4D) hierarchy and the display means is enabled to update the display of the floor plan to display the schedule data and the activity data associated with each user-defined building model that are active as of a current date, and including a textual overlay being a plurality of text items shown proximally positioned near respective three dimensional construction components.

17. The system of claim 16, wherein the graphical representation is selected from a group consisting of design development drawings, specifications, construction drawings, shop drawings, and design details.

18. The system of claim 16, wherein the user interface is enabled to receive the user input to change a perspective of the graphical representation by moving the perspective forward, moving the perspective backward, moving the perspective vertically upward, moving the perspective vertically downward, tilting the graphical representation, sliding the perspective, rotating the perspective around the graphical representation, and aligning the perspective with a vertical plane.

19. The system of claim 16, wherein the user interface is enabled to receive the user input to choose three dimensional (3D) graphical representation and four dimensional (4D) graphical representation.

20. The system of claim 16, wherein the user interface is enabled to receive the user input to save a perspective.

21. The system of claim 16, wherein the user interface is enabled to receive the user input to identify a clipping plane which renders the graphical representation on a first side of the clipping plane invisible while the second side of the clipping plane is visible.

22. The system of claim 16, wherein the user interface is enabled to receive the user input to segment the construction components into a plurality of smaller segments to provide the granularity necessary to schedule the activities associated with the plurality of smaller segments.

23. The system of claim 16, wherein the user interface is enabled to receive the user input to generate temporary lay down areas in a graphical representation that is four dimensional.

24. The system of claim 16, wherein the user interface is enabled to receive the user input to view one construction component of the graphical representation.

25. The system of claim 16, further comprising a four dimensional state array coupled to the display means wherein the display means increments the date and updates the graphical representation using the four dimensional state array to display construction components and associated activity data that are active at the current date.

26. The system of claim 25, wherein the user interface is enabled to receive the user input to view a specific date.

27. The system of claim 16, wherein the activity data displayed includes a start date and an end date.

28. The system of claim 16, wherein the display means displays a two dimensional textual overlay that includes is a color-coded list of items positioned in a first user-defined position of the display means and a color-coded activity legend positioned in a second user-defined position of the display means, wherein the user interface is enabled to receive a first user-defined position and a second user-defined position.

29. The system of claim 16, wherein a color is associated with the graphical representation of the construction component and the same color is associated with a respective schedule item such that the user is enabled to visually differentiate between a component that is being constructed on a given date and a component that has been completed on a prior date.

30. The system of claim 16, wherein the display means displays a three dimensional textual overlay whereby schedule items are shown proximally located near the associated construction component.

31. A method of applying an analytical tool to a computer-resident multidimensional graphical construction project model, comprising:

retrieving an activity data, a schedule data, a display data, a previously stored four-dimensional (4D) hierarchy of a construction project model, and relationships between the schedule data and the previously stored four-dimensional (4D) hierarchy, wherein the previously stored four-dimensional hierarchy represents an animated sequencing of a virtual construction of a building according to a user design and the schedule data and wherein the schedule data is associated with a plurality of schedule items;

ascertaining, for the computer-resident multi-dimensional graphical construction project model in a display window, which of the plurality of schedule items are active at a given displayed time;

listing the plurality of schedule items to be displayed in the display window; and overlaying an activity description and an activity legend in the display window, wherein the activity description is related to a respective one of the plurality of schedule items.

32. The method of claim 31, wherein overlaying an activity description and an activity legend further comprises positioning a color-coded list of items in a lower area of said display window and positioning said activity legend in an upper area of said display window, said activity legend being color-coded.

33. The method of claim 31, wherein overlaying the activity description and the activity legend further comprises positioning a plurality of text items proximally near a component of a construction project shown in said construction project model that is affected by a schedule item described by said textual overlay.

34. The method of claim 33, wherein said activity description and said activity legend are color-coded.

35. The method of claim 31, including generating a graphical representation selected from a group consisting of design development drawings, specifications, construction drawings, shop drawings, and design details.

36. The method of claim 31, including enabling a user interface to receive the user input to change a perspective of a graphical representation by moving the perspective forward, moving the perspective backward, moving the perspective vertically upward, moving the perspective vertically downward, tilting the graphical representation, sliding the perspective, rotating the perspective around the graphical representation, and aligning the perspective with a vertical plane.

37. The method of claim 31, including enabling a user interface to receive a user input to choose three dimensional (3D) graphical representation and four dimensional (4D) graphical representation.

38. The method of claim 31, including enabling a user interface to receive a user input to save a perspective.

39. The method of claim 31, including enabling a user interface to receive a user input to identify a clipping plane which renders the graphical representation on a first side of the clipping plane invisible while the second side of the clipping plane is visible.

40. The method of claim 31, including enabling a user interface to receive a user input to segment the construction components into a plurality of smaller segments to provide the granularity necessary to schedule the activities associated with the plurality of smaller segments.

41. The method of claim 31, including enabling a user interface to receive a user input to generate temporary lay down areas in a graphical representation that is four dimensional.

42. The method of claim 31, including enabling a user interface to receive a user input to view one construction component of the graphical representation.

43. The method of claim 31, further comprising a four dimensional state array coupled to a display wherein the display increments the date and updates the graphical representation using the four dimensional state array to display construction components and associated activity data that are active at the current date.

44. The method of claim 43, including enabling a user interface to receive a user input to view a specific date.

45. The method of claim 31, including displaying a start date and an end date.

46. The method of claim 31, including displaying a two dimensional textual overlay that includes a color-coded list of items positioned in a first user-defined position of a display and a color-coded activity legend positioned in a second user-defined position of the display, and including enabling the user interface to receive a first user-defined position and a second user-defined position.

47. The method of claim 31, including associating a color with the graphical representation of the construction component and associating the same color with a respective schedule item such that a user is enabled to visually differentiate between a component that is being constructed on a given date and a component that has been completed on a prior date.

48. The method of claim 31, including displaying a three dimensional textual overlay whereby schedule items are shown proximally located near the associated construction component.

* * * * *